March 25, 1969 D. H. MARGOLIEN ET AL 3,435,446

DIGITAL ENCODER

Filed Jan. 4, 1965 Sheet 1 of 2

INVENTORS:
David H. Margolien
Walter N. Kanawyer

By Robert H. Lent
Attorney

DIGITAL ENCODER

Filed Jan. 4, 1965

INVENTORS:
David H. Margolien
Walter N. Kanguwer
By Robert H. Lentz
Attorney

United States Patent Office 3,435,446
Patented Mar. 25, 1969

3,435,446
DIGITAL ENCODER
David H. Margolien, Los Angeles, Woodland Hills, and Walter N. Kanawyer, Ventura, Thousand Oaks, Calif., assignors to Litton Precision Products, Inc., Beverly Hills, Calif.
Filed Jan. 4, 1965, Ser. No. 423,077
Int. Cl. G08c 9/08
U.S. Cl. 340—347 10 Claims

ABSTRACT OF THE DISCLOSURE

A triply redundant contact digital encoder is disclosed. The encoder comprises a commutator and a plurality of contacts. The commutator is in the form of a disc substrate having a pattern of discrete conducting segments positioned in a plurality of annular zones on the disc, each zone representing a digit of a digital number. To achieve redundancy capability, preselected zones are divided into three annular tracks of about the same width with the respective patterns angularly displaced from one another. Each track is in engagement with a contact and a contact of each track in a zone is electrically connected to contacts of the other tracks in the zone.

Figure 1:
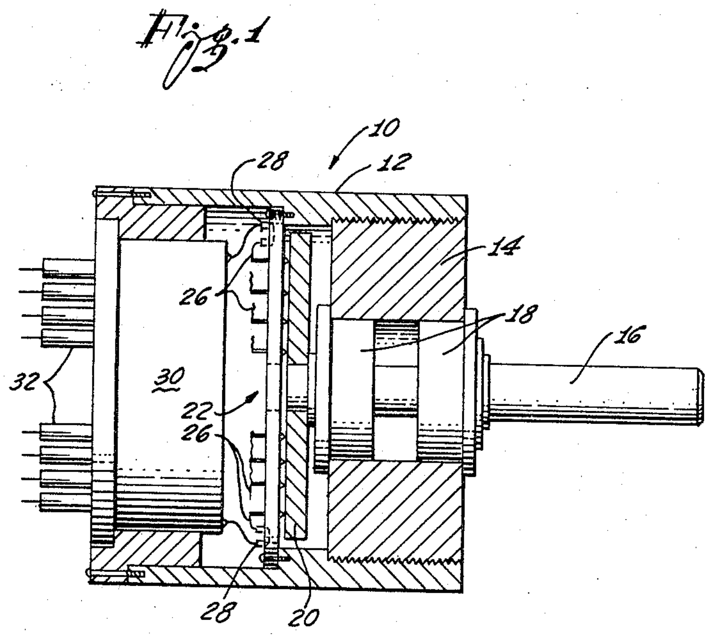

The present invention relates in general to an improved analog-to-digital converter and in particular to a rotational shaft encoder employing a novel contact brush and brush block arrangement for converting the shaft position into a digital number representative of the shaft position.

As is well known in the prior art, an analog signal in the form of a shaft rotation may be converted to a digital signal by means of a rotational shaft encoder. Basically, these encoders include a rotating encoder disc, or commutator, having a separate annular track or zone for each binary digit of the digital number to be represented. Each annular track includes separate segments or areas which are representative of the value of the binary digit represented by the particular annular track. In the majority of encoders, the areas comprising the annular rings are alternately electrically conductive and non-conductive. When an electrically conductive contact brush is placed in contact with one of the annular rings on the commutator, an electrical current flows through the brush whenever a conductive area passes under the brush. In this manner, the value of each digit of the binary number which is representative of the shaft position is determined. By connecting an electrical conductor to each of the brushes, the signal representing the binary number can be externally applied to an automatic digital computer. It should be noted at this point that while there are shaft encoders on the market of the non-contact variety, such as magnetic encoders or optical encoders, still the brush-type shaft encoder is the simplest, the most reliable, and the least expensive.

It has been found, however, that prior brush encoders suffer from several limitations. These limitations are caused mainly by the type of L-shaped spring contact which is used in most of the present commercial encoders. During the operation of these commercial encoders, the commutator often rotates at relatively high speeds. Because of the presence of dust or wear particles and any unevenness of the commutator surface, the spring contacts tend to bounce up and down and to have side to side motion. These oscillations and motions sometimes progress into destructive resonant oscillations which cause extremely large G forces to be applied to the commutator surface and cause the points and edges of the contacts to dig into the surface of the commutator.

In the commercial contact encoder, the bouncing of such contacts is generally counteracted by holding the contacts against the surface of the commutator with a relatively large amount of force. While in some cases this is partially successful, this large amount of force causes an excessive amount of friction to be generated at the surface of the commutator and results inevitably in a substantial wearing of both the surface of the commutator and the contact itself, greatly shortens the life of the encoder and creates a significant amount of noise. It is apparent, moreover, that once wear particles have been created on the surface of the commutator, an irreversible process of degradation of the encoder performance takes place. The wear particles created on the surface of the commutator causes the contacts to bounce even more violently and also contribute to sideways flutter and chatter. In addition, the now roughened surface causes even a greater amount of friction to be generated, thereby distorting the position of the L-shaped spring contact along its annular track. It is apparent, of course, that once being generated these wear particles remain on the surface of the commutator, the metal particles causing the device to short out and the insulating particles causing the device to have open circuits. In addition, the bouncing of the contacts causes the encoder to miss counts and generally cease to function adequately. It should also be noted that once the contacts have been affixed to the brush blocks of commercial encoders, there is no simple or economical method for adjusting the position or pressure of the contacts with respect to the commutator. It is all too obvious that any initial inaccuracies or subsequent changes in contact pressure and contact position are detrimental to the proper performance of a precision encoder.

Some attempts have been made in the encoder field to overcome the poor performance of encoders by providing more than one contact for each annular track, thus hoping to obtain accuracy through redundancy. If these multiple contacts are placed in-line, however, the above-stated disadvantages resulting from the excessive wear received by the single track on which all of them are riding far exceeds any advantages obtained by the redundancy feature. In many types of encoders, it has been attempted to place the contacts side by side. This has resulted, however, in the fabrication of a commutator which is larger or has less digit tracks or in the fabrication of finer and more fragile contacts. It is apparent that the larger commutator or the commutator with less digit tracks make the encoder less inherently useful. The finer contacts, on the other hand, are subject to faster wear, more violent bouncing because of their lesser weight and more defection and flutter because of their thinner structure; in addition, they are less able to endure contact pressure. The combination of these disadvantages far outweigh any gains which may be obtained from their redundancy features.

The present invention has succeeded in overcoming all of the disadvantages of the prior art devices by providing a triply redundant contact encoder in which a plurality of large, well formed contacts accurately maintain a precisely predetermined position with respect to the code pattern of the commutator. The brush block of the encoder is designed to allow each contact to be mechanically independent, to be individually spring loaded against the commutator, and to have an extremely small axial wobble. The present encoder is also designed to have an oil lubrication, flushing and damping system in which the structure of the contacts and the brush block, in conjunction with various adhesion and Bernoulli forces, serves to damp the motion of the contact and, by pumping action, to reciprocally circulate oil along the surface of the contacts and the commutator to lubricate the motion of the contact over the commutator and to flush wear particles from the surface of the commutator and deposit them on the lower surface of the brush block. The provision for redundancy in the present invention has been combined with a novel commutator arrangement which, instead of requiring the redundant contacts to be diminished in size and placed closely together, enables the contacts to be large and well formed and to be widely spaced apart. This novel commutator arrangement enables the contacts to be placed so as to optimize design features without increasing the fabrication difficulty and expense ordinarily attendant in the use of a large number of contacts.

It is therefore, the primary object of the present invention to provide a new and improved rotational shaft encoder of the contact variety.

It is another object of the invention to provide an encoder in which both the location and the contact pressure of the contacts can be easily and accurately predetermined.

It is a further object of the present invention to provide an encoder in which the contacts suffer from minimal deflection, contact bounce and friction.

It is still another object of the present invention to provide an encoder in which the contact surface is continuously lubricated and any wear particles are swept away from the contact region and deposited on the brush block.

It is a still further object of the present invention to provide an encoder in which no final adjustment of the location or contact pressure of the contacts is necessary.

It is still another object of the present invention to provide a highly accurate and reliable encoder having a long life, capable of easy fabrication and inexpensive to manufacture.

It is a further object of the present invention to provide a novel commutator.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only and are not intended as a definition of the limits of the invention.

Figures 2C, 4:
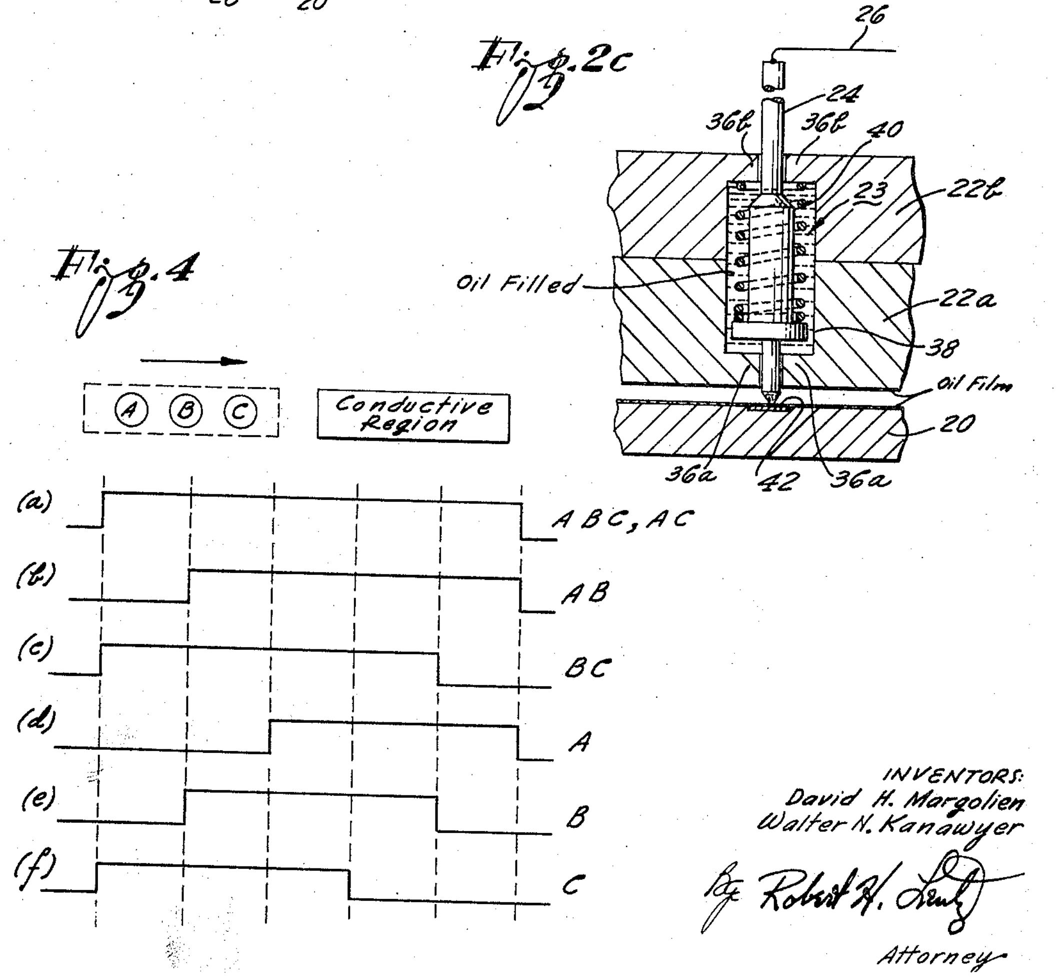
Figures 2A, 2B, 3:
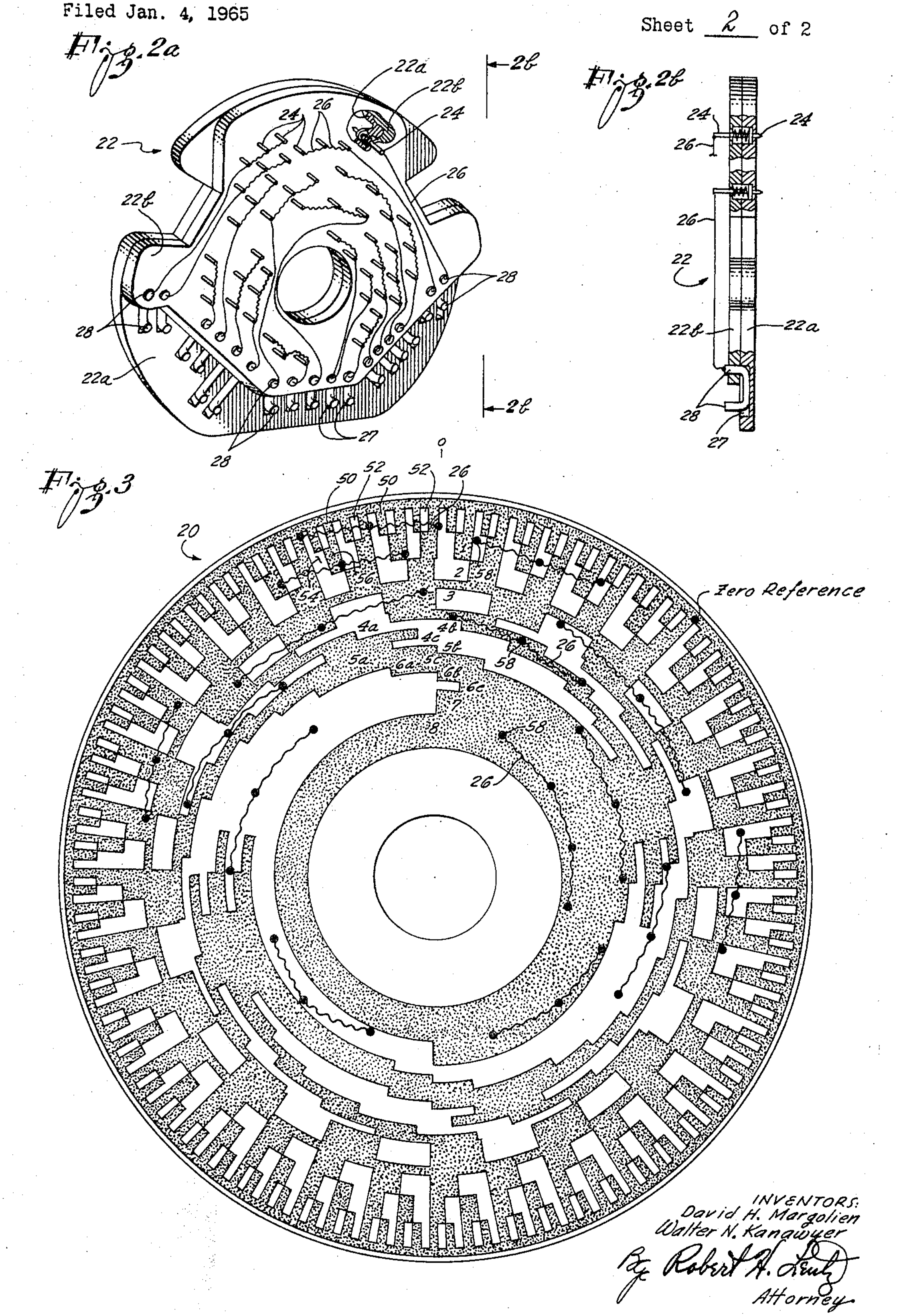

FIGURE 1 is a simplified cross-section view of a rotational shaft encoder containing the present invention;

FIGURE 2*a* is an isometric view of the brush block assembly of the present invention;

FIGURE 2*b* is a cross-sectional view of the brush block assembly of FIGURE 2*a*;

FIGURE 2*c* is a detailed cross-sectional view of the pin-like contact of the present invention;

FIGURE 3 illustrates the novel commutator employed in the present invention; and FIGURE 4 illustrates waveforms obtained from a connected set of contacts.

In the description of the invention to follow, corresponding referenced numerals have been carried forward throughout the figures to designate like parts of the invention.

In FIGURE 1 there is shown a rotational shaft encoder generally designated as 10. The encoder includes a housing 12 and a support member 14 inserted therein which holds an input shaft 16, a pair of bearings 18 and a commutator 20. The commutator 20 is concentrically coupled to the shaft 16 for rotation therewith. A brush block 22 is screwed to the housing 12 and has a plurality of contacts 24 positioned therein and held in tension against the commutator 20. Leads 26 connect the contacts 24 to a plurality of terminals 28. The terminals 28 are connected to a diode package 30 which contains a plurality of blocking diodes coupled to the leads 26 to isolate the encoder 10 from erroneous external signals. The leads 26 are coupled through the diodes of diode package 30 to a corresponding plurality of external coupling connectors 32 which extend out of the rear of encoder 10. The external coupling conductors 32 and the diode package 30 are held by support 34 which is screwed into the housing 12 of the encoder 10.

The brush block 22 is shown in more detail in FIGURES 2*a, b,* and *c*. The brush block 22 is composed of a lower brush block **22*a* and an upper brush block 22*b*. Each of the brush blocks 22*a*, 22*b* has a plurality of precisely positioned holes formed in it having shoulders 36*a*, 36*b* (formed, for example, by counter-boring). When the brush blocks 22*a*, 22*b* are placed together in registration, a plurality of holes 23 having retaining shoulders 36*a*, 36*b* are formed in the brush block 22 in which the contacts 24 are contained. A plurality of slots 27 are also formed in the lower brush block 22*a* into which the U-shaped terminals 28 are inserted. Preselected ones of the contacts 24 are connected by leads 26 to form a single electrical contact. The exact placement of the contacts 24 in the brush block 22** and their electrical intercouplings will be discussed in more detail in connection with FIGURE 3.

In FIGURES 2*a, b,* and *c,* the contacts 24 are shown as having an elongated, pin-like structure with a flange 38 near one edge thereof. The contact 24 is constrained by the hole 23 and the shoulders **36*a*, 36*b* to have limited motion in the direction of the commutator 20 and to have minimal sideways motion (deflection) and axial wobble. In the present device, the spacing between the shoulders and the contact is maintained between .2 and .3 mil; a larger spacing of 1–1.5 mils is maintained between the flange 38 and the walls of the hole 23. The contact 24 is forced towards shoulders 36*a* by a spring 40 which encircles the contact 24 and is compressed between shoulders 36*b* and flange 38. The spring 40 provides an elastic restraining force for any bouncing motion of the contact 24 normal to the commutator 20 and a very accurate contact pressure (approximately 1 gram) on the surface of the commutator 20. The length of the contact used in this embodiment is approximately 100 mils, the flange diameter 30 mils, the center shaft diameter 20 mills and the end shaft diameter 15 mils. The contact is composed of approximately 20% Cu and 80% Au and has a hardness of approximately 300–350 KNOOP. The commutator 20 may be composed of a plastic material, such as epoxy, while the conductive areas thereof, such as area 42**, may be composed of Au plated on a Ni-Fe base.

In the invention, the holes 23 are filled with a lubricating fluid, such as oil. The fluid is initially put on the commutator 20 (separated from lower brush block **22*a* by approximately 5–6 mils) which is then rotated with respect to the brush block 2. It is believed that the rotation of the contact(s) 24 with respect to the fluid causes (according to Bernoulli's theorem) a stagnation pressure greater than the general pressure in the field to exist in front of the contact 24. This pressure coupled with adhesion forces (causing capillary action) induces the fluid to flow up the contact end of the contact 24 into the cavity 23 and out onto upper brush block 22*b*; when the fluid appears on upper brush block 22*b*, hole 23 is completely filled. It has been experimentially determined that the placing of the fluid in hole 23 greatly improves the performance of the device. First, the fluid effectively damps any oscillatory motion of contact 24 and thus reduces to a minimum any bouncing action (and missed counts). Secondly, the fluid provides a film of lubrication between contact 24 and the surface of the commutator 20. This film reduces friction to a minimum and allows a large gram pressure to be put by contact 24 on the commutator 20 to further reduce bouncing action. Whatever bouncing action remains is utilized to pump fluid down the shaft of the contact 24 and in conjunction with the above-mentioned forces to form a recirculating system. In addition, any particles of epoxy or metal that are on the commutator 20** are either swept out of the path of the contact 24 or are caught up by this recirculating system and are deposited on the bottom of the lower brush block 22a. Thus, the fluid filled hole 23 acts as a lubrication reservoir to reduce friction, remove unwanted particles from the path of the contact 24, and provide hydraulic damping for the contact 24 to minimize contact bounce.

In FIGURE 3 the novel commutator employed in the present invention is illustrated. The commutator 20 comprises a series of annular zones (or tracks) designated 0 through 8. As explained more fully on pages 6–40 through 6–49 of "Notes on Analog-Digital Conversion Techniques," edited by Alfred K. Susskind, copyrighted 1957, the MIT Press, Cambridge, Massachusetts, zone 0 is called the least significant zone and is comprised of a series of alternating conductive and non-conductive segments 50 and 52. In accordance with the 2n progression of the binary code, zone 1 is composed of a series of alternating conductive and non-conductive segments 56 and 54 whose width is twice that of the segments in zone 1. In a similar fashion, zone 2 has segments twice the width of those in zone 1, and zone 3 twice the width of those in zone 2. In the novel commutator of the present invention, however, the three zones 4a, 4b and 4c comprise a single zone whose segments have a width twice that of those in zone 3. By splitting this single zone into a plurality of concentric annuli of like significance whose corresponding points or binary patterns have been circumferentially displaced from one another, it is now possible (as explained more fully hereafter) for a considerable number of large, well-formed and well-spaced contacts to be set in the brush block in positions which minimize difficulties in manufacture, assembly and maintenance. In a similar fashion, zones 5a, 5b and 5c comprising a single zone and zones 6a, 6b and 6c comprise a single zone. Zone 7 is termed the most significant zone and zone 8 acts as an electrical common for all the preceding zones.

In this embodiment of the invention, the V-scan reading method is employed, which method is fully described in the aforementioned reference. In brief, this method requires that a single brush be placed on the least significant zone, its position defining a reading index line, and a pair of brushes spaced an appropriate lead and lag distance from the reading index line be placed on all other zones (except the common) to ensure correct logic readout. It should be noted, however, that while in theory the brushes in the V-scan method of reading form a V, in practice this does not have to be the case. Once the brushes have been placed in proper position for V-scan logic, any brush may be shifted along its own track 2n segments (i.e. an even number thereof) and still give the proper reading for the V-scan logic. Moreover, each entire zone may be shifted a desired amount along with its respective brushes. In addition, as explained in the aforementioned reference on page 6–48, each brush may vary ±⅛ of a segment (on its own track) from its optimum placement (or ±¼ the previous track segment length). As will be explained hereafter, this allowed variance has been employed in the present invention to determine whether the contacts on selected tracks are making proper electrical contact.

As was illustrated in FIGURE 2a of the present invention, a plurality of electrically coupled contacts are used for each brush necessary in the V-scan method of reading in order to give the device redundancy and thus greatly increase its reliability. These contacts are represented in FIGURE 3 by a plurality of dots 58. In zone 0, three connected contacts are shown positioned on segment transition lines, each occupying its own separate track. In zone 1, six contacts are shown, three contacts leading their respective transition lines by one-half the previous segment length and three contacts lagging their respective transition lines by one-half the previous segment length. As in zone 0, zone 1 is divided into three annuli (tracks) with two contacts on each. Zones 2 and 3 have contact placements essentially identical to those in zone 1 with the appropriaate contact spacings from the transition lines (which lines are the equivalent of the reading index line because of the contact placement in zone 0) being used, as explained in equation (6–20) on page 6–48 of the aforementioned reference.

As described previously, zones 4a, b, c, 5a, b, c, and 6a, b, c comprise three zones which are each split into three separaate annuli circumferentially displaced from one another, each annuli having two contacts located thereon. Although some ease in contact placement has been obtained from shifting each contact an even number of segments or from shifting entire zones and their respective contacts, as explained previously, the foregoing feature of the present invention, the internal displacement of sections of a single zone, provides a degree of flexibility in contact placement unknown in prior art devices. This flexibility in contact placement not only allows triple redundancy to be used in the present device without sacrificing desirability and accuracy but also allows certain design features to be optimized such as the size and structure of the contacts, the size of the commutator, the spacing between electrically coupled contacts, the spacing between contacts on different zones, and the elimination of crossed lead wires. The significance of this feature is emphasized by the fact that fifty independent contacts are positioned on a commutator .85 inch in diameter and, more particularly, on an annular section thereof having a .295 inch I.D. and a .84 inch O.D. (four contacts being on zone 8 and a zero reference contact on the outer edge). In addition, no more than two contacts ride on the same track, and with minor modifications each contact could ride on its own separate track.

This flexibility in contact positioning makes possible, in addition, the determination as to whether the contacts on preselected zones are making proper electrical contact. While, as stated previously, the contacts in an encoder are generally placed a preselected distance (the optimum position) from the reading index line, the contacts may have a ±⅛ segment tolerance from such optimum position. In the present invention, each set of three contacts on zones 4–7 has one of its members placed at the optimum position and the others ±⅛ segment from the optimum position. If the signal from an electrically coupled trio of contacts is presented on an oscilloscope, an examination of the duration of the waveform and the make-break ratio (the length of time the contact is conducting to the length of time the contact is non-conducting) and an examination of the position of the trailing and leading edges of the conducting waveform enables the determination as to whether any of the contacts (except the central one alone) is not making proper electrical contact.

This method of determination is further illustrated with reference ot FIGURE 4. In FIGURE 4, a trio of contacts labeled A, B, C are shown traveling in the direction of the arrow towards a conductive region. The waveform resulting from one, two or three of the contacts making electrical contact is shown in (a) through (f). In (a) the waveform shown is generated when contacts, A, B, C, or A, C, are making electrical contact with the conductive region. It is thus not possible to determine whether contact B alone is functioning properly. If, however, contact C alone does not make electrical contact with the conductive region, then the leading edge of the waveform is delayed as shown in (b). Similarly, if contact A alone does not make contact, then the trailing edge of the waveform arrives early as shown in (c). In a similar fashion, (d), (e), and (f) show the waveform generated when only contacts A, B, C, respectively, are making electrical contact with the conductive region. In addition, for the particular commutator shown, the make-break ratio when only one contact is making electrical contact is 50/50, when two are making contact, 60/40, and when three are making contact, 65/35. In such a manner, nearly complete information can be obtained on the electrical contact characteristics of the contacts.

Having described the invention, it is apparent that numerous modifications and departures may be made by those skilled in the art.

What is claimed is:

1. In a digital encoder, a commutator comprising a substrate and a plurality of discrete conducting segments supported by said substrate positioned within a series of zones, each zone representing only one digit of a digital number; preselected ones of said zones being divided into a number of redundant tracks with corresponding points in said tracks being displaced from one another, each of said tracks of a zone adapted to be engaged by a contact which is connected to contacts engaging each of the other tracks of said zone.

2. In a digital shaft encoder, a commutator having a plurality of discrete conducting segments positioned to form concentric tracks, each track representing only one digit of a digital number; preselected ones of said tracks being divided into a number of concentric redundant annuli with corresponding points in said concentric annuli being circumferentially displaced from one another, each of said annuli of a track adapted to be engaged by a contact which is connected to contacts engaging each of the other annuli of said track.

3. In a digital shaft encoder, a commutator having a plurality of spaced annular rings established thereon, each ring representing only one digit of a digital number, and each of said rings having a pattern composed of alternately conductive and nonconductive segments for representing the value of a digit, at least one of said rings being divided into a number of redundant annular tracks of differing radii with the corresponding patterns on said tracks being angularly displaced from one another, each of said tracks of a ring adapted to be engaged by a contact which is connected to contacts engaging each of the other tracks of said ring.

4. In a digital shaft encoder, the combination comprising: a commutator having a plurality of discrete conducting segments thereon positioned within concentric tracks each track representing only one digit of a digital number, at least one of said tracks being divided into a number of redundant annuli of differing radii, each of said annuli having a pattern of discrete conducting segments corresponding to a pattern of discrete conducting segments on another of said annuli, each of said annuli being disposed so that each of said patterns are angularly displaced from one another; contact mounting means; and a plurality of electrical contacts positioned in said mounting means and in contact with said tracks, a plurality of said contacts being in contact with each of said tracks and each of said annuli in contact with at least a different one of said contacts.

5. The combination of claim 4 wherein preselected ones of said plurality of contacts in contact with each of said tracks are electrically coupled.

6. The combination of claim 4 wherein at least one contact in contact with an annuli from a preselected track is electrically coupled with at least one contact in contact with each of the other annuli from said preselected track.

7. In a digital shaft encoder, the combination comprising:

a commutator having a surface and a plurality of discrete conducting segments supported thereon positioned within concentric tracks and forming a sequence of digit representing patterns, each track representing patterns, each track representing one digit of said sequence, at least one of said tracks being divided into a number of annuli of differing radii, each of said annuli having a pattern of discrete conducting segments corresponding to a pattern of discrete conducting segments on another of said annuli and each of said annuli being disposed so that each of said patterns are angularly displaced from one another; contact mounting means; and a plurality of electrical contacts positioned in said mounting means and in contact with said tracks, said electrical contacts being constrained by said mounting means to move substantially perpendicular to said surface of said commutator.

8. In a digital encoder, the combination comprising:

a commutator having a plurality of discrete conducting segments thereon positioned within a series of zones, each zone representing only one digit of a digital number, preselected one of said zones being divided into a number of tracks, each track having a pattern of discrete conducting segments corresponding to a pattern of discrete conducting segments on another of said tracks, each of said tracks being disposed so that each of said patterns are angularly displaced from one another; contact mounting means; and a plurality of electrical contacts positioned in said mounting means and being in contact with said zones.

9. The combination of claim 8 wherein said electrical contacts are constrained by said mounting means to move substantially perpendicular to the surface of said commutator.

10. The combination of claim 8 wherein a plurality of said contacts are in contact with each of said zones and at least one of said contacts contact each of said tracks.

References Cited

UNITED STATES PATENTS

| | | | |
|---|---|---|---|
| 2,873,441 | 2/1959 | Miller | 340—347.3 |
| 2,958,860 | 11/1960 | Petherick | 340—347.3 |
| 2,977,582 | 3/1961 | Wolman | 340—347.2 |
| 3,070,787 | 12/1962 | Waldron et al. | 340—347.2 |
| 3,100,299 | 8/1963 | Congdon | 340—347.3 |
| 3,111,660 | 11/1963 | Stupar | 340—347 |
| 3,143,730 | 8/1964 | McIntyre | 340—347 |

MAYNARD R. WILBUR, *Primary Examiner.*

JEREMIAH GLASSMAN, *Assistant Examiner.*

PO-1050
(5/69)

UNITED STATES PATENT OFFICE
CERTIFICATE OF CORRECTION

Patent No. 3,435,446 Dated March 25, 1969

Inventor(s) David H. Margolien and Walter N. Kanawyer

It is certified that error appears in the above-identified patent and that said Letters Patent are hereby corrected as shown below:

Column 4, line 52, the figure "2" should be --22--.

Column 4, line 55, "field" should be --fluid--.

Column 6, line 56, "ot" should be --to--.

Column 8, lines 9 and 10, delete "each track representing patterns,"

SIGNED AND
SEALED

OCT 21 1969

(SEAL)
Attest:

Edward M. Fletcher, Jr.
Attesting Officer

WILLIAM E. SCHUYLER, JR.
Commissioner of Patents